Dec. 21, 1937.　　　　E. J. BARNETT　　　　2,102,877
DEVICE FOR DISPENSING MEASURED QUANTITIES OF DIVIDED MATERIAL
Filed Oct. 26, 1936　　　2 Sheets-Sheet 1
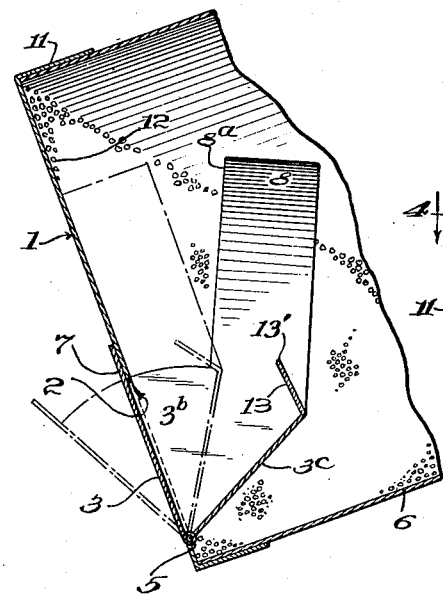
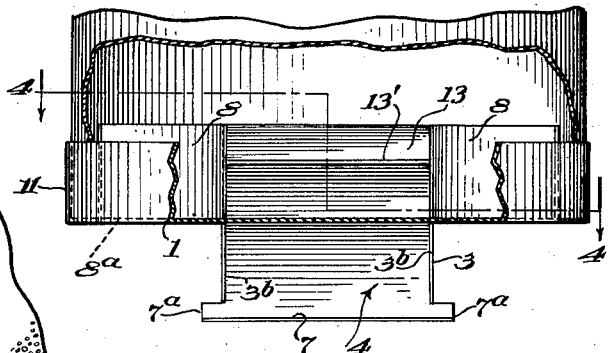
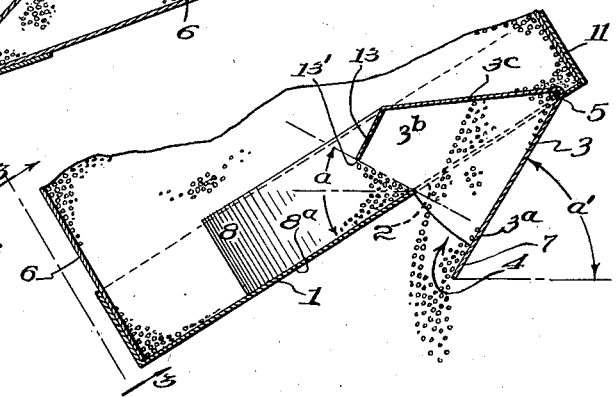
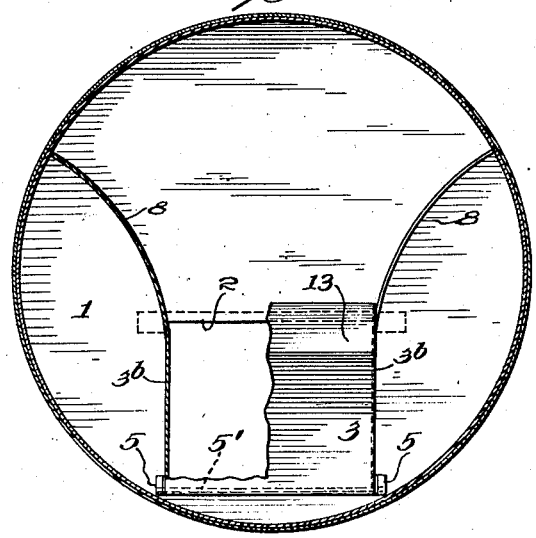
INVENTOR.
Edward J. Barnett,
BY
ATTORNEYS.

Dec. 21, 1937.  E. J. BARNETT  2,102,877
DEVICE FOR DISPENSING MEASURED QUANTITIES OF DIVIDED SOLID MATERIAL
Filed Oct. 26, 1936  2 Sheets-Sheet 2
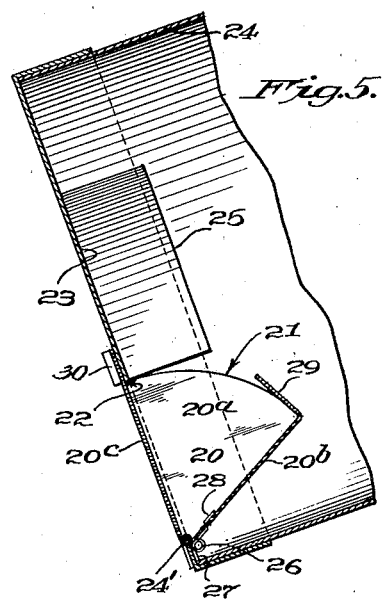
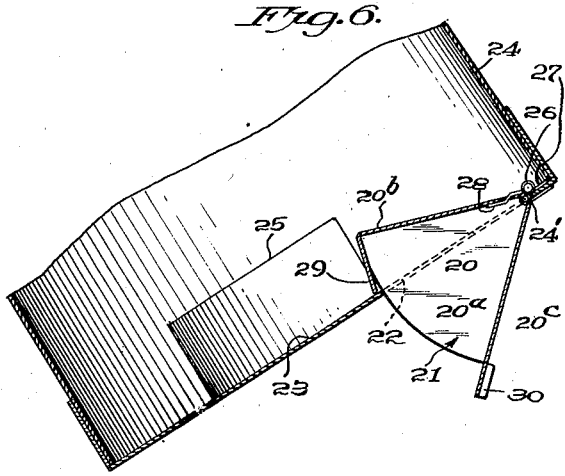
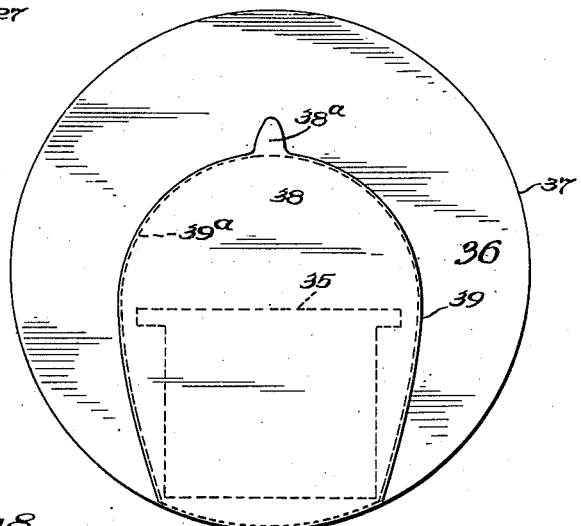
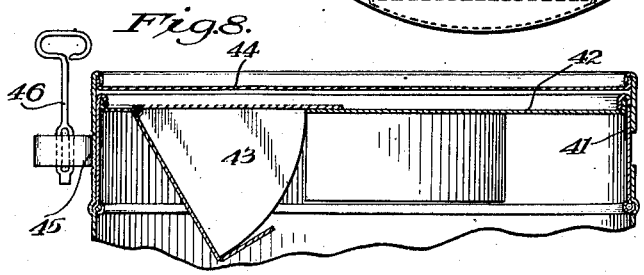
INVENTOR.
Edward J. Barnett,
BY
ATTORNEYS.

Patented Dec. 21, 1937

2,102,877

UNITED STATES PATENT OFFICE 2,102,877

DEVICE FOR DISPENSING MEASURED QUANTITIES OF DIVIDED SOLID MATERIAL

Edward J. Barnett, Compton, Calif.

Application October 26, 1936, Serial No. 107,616

3 Claims. (Cl. 221—98)

This invention relates to devices for dispensing a measured quantity of divided solid material from a container, and pertains particularly to a device which may be associated with a container or package structure to dispense successive measured quantities of a divided solid material from such container. One of the particular objects of the invention is to provide a device which may be employed to dispense successive equal quantities of a divided solid material from a container, by inverting such container and rotating the same between two positions which, respectively, serve to fill the dispensing device from the container and to discharge the material within the dispensing device.

A further object of the invention is to provide a device of the character described which is gravity operated between a filling position (in which the device receives a measured quantity of material from the container) and a dispensing position in which the measured material is discharged from the device to use.

A further object of the invention is to provide a device of the character described which may be readily fabricated at a low cost for materials and labor. A further object of the invention is to provide a device which automatically effects a closure of the container with which it is associated when such container is placed in the normal position for storage, whereby contamination of the material within the package by exposure to atmospheric air or other agency is substantially prevented.

The device of the present invention may comprise, essentially, a wall member forming a part of a container or adapted to be associated with the container in the role of a closure member or the like, provided with an opening within which a measuring hopper element is pivotally disposed, such hopper member being adapted for pivotal movement about an axis adjacent one edge of said opening between one position substantially wholly to one side of the wall member (corresponding to the interior of the associated container) and another position at least partly at the other side of said wall member (corresponding to the exterior of the container) whereby, when said wall member is in its normal position with respect to a container, the hopper member may be moved from a position substantially wholly within the container to a position projecting therefrom. The device is also preferably provided with suitable guide members located interiorly of the container in position to direct material toward and into the hopper member in the portion of the operation during which the hopper member is filled with a quantity of material which is to be subsequently dispensed. According to one embodiment of the invention the hopper member is provided with spring means positioned to bias the hopper member inwardly of the container whereby said hopper member is caused to adopt a position to receive a quantity of material to be dispensed when the container is moved toward a normal position from a dispensing position.

Other objects of the invention will be hereinafter brought out in connection with the description thereof or will be apparent from such description. The accompanying drawings illustrate certain preferred embodiments of the invention and referring thereto:

Fig. 1 is a partly broken-away sectional view of one form of the device attached to a container, showing the device in filling position;

Fig. 2 is a corresponding view of the same form of device showing the same in dispensing position;

Fig. 3 is a side elevation thereof taken on line 3—3 in Fig. 2, with portions broken away;

Fig. 4 is a transverse sectional view thereof taken on line 4—4 in Fig. 3, inverted so that the dispensing member is disposed at the lower side, for the purpose of clarity;

Fig. 5 is a view corresponding to Fig. 1, illustrating a modified form of the invention;

Fig. 6 is a view corresponding to Fig. 2, of the form of invention shown in Fig. 5;

Fig. 7 is an end view of a container provided with a device according to the present invention, showing an auxiliary protecting element which is removably disposed over the dispensing device to provide a hermetic seal for the container prior to use; and Fig. 8 is a transverse section of a form of construction which may be provided where the dispensing means of the present invention is integrally formed with the container, which provides a hermetic seal for the container prior to the time the container is placed in use.

Referring to Figs. 1 to 4 of the drawings, the device of the present invention may comprise a container wall member 1 provided with an opening 2 located preferably adjacent one edge of the wall 1, within which is mounted a hopper member 3 which preferably comprises a wedge-shaped container member having an open edge or end 4 and pivotally secured to the wall member 1 along the apex end as at 5. The pivotal axis of the hopper member 3, as defined for example by hinge pin 5', preferably extends substantially parallel to and closely adjacent the plane of the wall member 1. The hopper 3 is preferably movable between positions in which substantially the entire hopper is disposed at one side of the wall 1 (the side which would face inwardly of the container 6 in use) to a position in which the open end 4 of the hopper is at least in part directed outwardly from the opening 2 at the other or outer side of the wall, as shown in dot-dash lines at Fig. 1 and full lines in Fig. 2, and the outer or forward wall 3a of the hopper 3 is preferably extended beyond the limit of the hole or opening 2 as at 7 to limit the inward movement of said hopper. Suitable guiding members are preferably also provided at the container side of the wall 1, such as are shown at 8 in this form of the device. These guide members may conveniently be formed as extensions of the side walls 3b of the hopper 3, and serve the additional function of limiting the outward movement of the hopper 3 through the opening 2, as by engagement of the forward edges 8a thereof with the wall 1 as shown in dot-dash lines in Fig. 1 and in full lines in Fig. 2.

The form of device shown in Figs. 1 to 4 may be formed as a cap member 11 adapted to be placed in position over the open end of a container 6 in the role of a closure member for such container. It will be apparent that the wall 1 may be formed integrally with the container if so desired, as hereinafter shown more particularly in Fig. 8.

In the use of the device, in dispensing a divided solid material, such as granulated soap, pulverized or ground coffee, salt, sugar, or any comparable material, the container is moved to a position somewhat as indicated in Fig. 1, i. e., in position such that the contained material will be allowed to fall or will be thrown against the wall 1, as indicated at 12. The material will fall into the filling space defined by the interior of the hopper 3, being in part guided into the filling space through the agency of the guide members 8. In this filling operation, the hopper 3 may be held in its interiorly disposed position as shown in Fig. 1 through the agency of the forefinger of the user, if necessary, although in general the container may be so manipulated that the hopper will be maintained in its interior position due to the weight thereof which lies to one side of the pivot 5 overbalancing the weight of the portion of the hopper at the other side of said pivot, as will be apparent. To dispense the material contained within the hopper 3 it is merely necessary to incline the container at a greater angle to the horizontal, so that the hopper member 3 will move by gravity outwardly toward the position shown in Figs. 2 and 3, after which the container is rotated to some such position as shown in Fig. 2 to allow the material 12 to fall from the forward wall 3a of the hopper.

In order to prevent material from readily flowing from the interior of the container 6 through the opening 2 when the device is in the position shown in Fig. 2, I preferably provide a guiding or deflecting tab 13 secured to or formed integrally with the rear wall 3c of the hopper 3, which tab preferably extends in a direction generally away from the pivot 5 and toward the opening 2. The tab member 13 is preferably of such length and is so positioned that the forward end thereof 13' will be located in such position that a line drawn from said end 13' to the near edge of the opening 2 will make an angle a with the wall 1 which is less than the "angle of repose" of the material within the container 6. If the angle a is smaller than the angle of repose of the contained material, the material will not fall from the device when the wall 1 is in horizontal position. With the wall 1 in horizontal position, the forward wall 3a of the hopper 3 may not be at a sufficient angle to the horizontal as to allow the contained material to slide along this wall in the dispensing operation, and it is therefore usually necessary to rotate the container until the wall 1 is at an angle to the horizontal. In this event, the effective angle of the material between the end 13' and the edge of the opening 2 will become increasingly less as the wall 1 departs from the horizontal, ultimately reaching a relatively small value as shown at the upper side of the dot-dash line which practically bisects angle a in Fig. 2, such dot-dash lines representing the horizontal. As long as this relatively small portion of the angle a is less than the angle of repose, no material may flow from the interior of the container through the opening 2 during the dispensing operation.

The angle which the forward wall 3a of the hopper 3 should make with the horizontal in order to provide free flow from the interior of the hopper will depend upon the nature of the material being dispensed, and may vary within relatively wide limits. This angle is indicated generally at a' and may be in general somewhat greater than the above-mentioned effective portion of the angle a. It is to be appreciated that the specific design of the hopper, the degree of forward movement thereof, and the position of the tab 13 will be established in a desired form for a particular type of material being dispensed, such conditions of design and construction being readily apparent to one skilled in the art who has a knowledge of the physical characteristics of the material to be dispensed.

After a measured quantity of material has been dispensed from the hopper 3, the container may then be returned to a position comparable to that shown in Fig. 1 and the body of material which was disposed downwardly to the left of the hopper as shown in Fig. 2 will be guided downwardly into the hopper through the agency of the guide members 8 as the container is returned to the Fig. 1 position. If desired, the forward wall 3a may be pressed inwardly by the operator or user, in order to allow full or complete filling of the space within the hopper 3, or the container may be returned to its normal vertical position and the first-described dispensing operation repeated.

A somewhat modified form of the device is shown in Figs. 5 and 6, in which the position shown in Fig. 5 corresponds roughly to that shown in Fig. 1 in connection with the first described form of the invention, and the position shown in Fig. 6 corresponds generally to that position shown in Fig. 2. This form of device may comprise a hopper member 20 provided with an open end portion 21 and arcuate side walls 20a which are adapted for sliding movement through an opening 22 in the forward wall 23 of the container 24, the hopper 20 being pivotally secured to the wall 23 as at 24'. In this form of the invention the guide members are shown as secured directly to the wall 23, and are designated at 25. The guide members are preferably so arranged as to substantially conform to continuations of the side walls 20a, somewhat after the manner of disposition of the guide members 8 in the first described form of the invention. In this form of the invention the hopper 20 is shown as provided with a biasing member or spring 26 secured to the wall 23 as at 27 and also secured to the rearward wall 20b of the hopper 20 as through the agency of the engagement of one end 28 of the spring with the inner surface of the wall 20b through a suitable opening in said wall. The spring 26 is so positioned as to produce a bias of the hopper 20 toward its interior position shown in Fig. 5, and is useful in returning the hopper to the interior position in a repetition of a dispensing procedure, eliminating the necessity for returning the hopper to its interior position by manual means. Said spring, however, may be omitted in this form of the invention, and it will also be understood that a comparable spring or biasing means may be employed, if desired, in connection with the form of invention shown in Figs. 1 to 4.

This particular form of hopper is also shown as provided with a modified form of deflecting tab 29, corresponding generally in function to the tab 13 above described. This particular form of tab is directed to engage the inner surface of the wall 23 when in dispensing position, as shown in Fig. 6, thereby eliminating any tendency for the contained material to pass through the opening 2 when the hopper 20 is in its forward dispensing position. The manner of use of this particular form of the invention is substantially equivalent to the above-described manner of use of the form shown in Figs. 1 to 4, as will be apparent to one skilled in the art.

The portion 7 of the front wall 3a of the hopper 3 is preferably extended laterally beyond the limits of the opening 2, to provide opposingly disposed ears or tab members 7a which are more particularly shown in Fig. 3. These tab members provide for ready engagement by the operator of the hopper member 3 to pull the same outwardly into dispensing position such as shown in Fig. 2 in the event that the material within the container is so closely packed as to interfere with the operation of the device under the influence of gravity. This same construction is preferably also provided in the form shown in Figs. 5 and 6, as by means of tab members formed in the forward wall 20c of the hopper 20, as at 30, and in this case the tabs 30 are preferably bent outwardly from the plane of the wall 3a to assist in the ready engagement thereof by the fingers of the operator.

It is desirable to provide some auxiliary means for maintaining a tight seal of the container, so that the contained material may be stored under substantially hermetic conditions until use thereof. Where the dispensing means of the present invention is provided as a separate cap element adapted to be placed over the container after removal of a sealing cover, this precaution is not necessary, but in general the dispensing means will be formed as a permanent element of the container, and I therefore provide some hermetic sealing means such as are shown in Figs. 7 and 8.

Referring to Fig. 7 specifically, the general position of the dispensing means is indicated in dotted lines at 35 on one end wall 36 of a container 37. A sealing or enclosing tab 38 is secured to the wall 36 in position to cover the dispensing means 35 and the adjacent portions of wall 36, and the tab 38 is hermetically secured to the wall 36 as by solder or the like at the marginal portion 39 of said tab, as indicated by the dotted line 39a. The tab 38 may be removed from the wall 36 as by forcible removal through the agency of a key which is placed in position over a projection 38a which is not soldered or otherwise secured to the wall 36, in accordance with the conventional technique for opening cans, such as sardine cans.

The form of device shown in Fig. 8 may comprise a container 41 provided with an integral upper wall 42 to which a dispensing device of the present construction is secured, as at 43. A removable cover 44 is provided for the container formed integrally with the container wall in accordance with common practice in packing coffee or the like, the cover 44 being removable from the container body through the agency of a separable strip 45 which is removed from the container through the agency of a key or the like 46, the strip being shown in the process of removal at the left side of Fig. 8 and the appearance of the container after removal of the strip being shown at the right side of Fig. 8. After this strip is removed, the cover 44 may be also removed, to permit dispensing of the contents.

Numerous modifications in the specific design and construction of the device of the present invention will occur to those skilled in the art, and I do not choose to be limited to the specific embodiments herein delineated and described, but rather to the scope of the appended claims. For example, the respective types of guide members shown at 8 and 25 may obviously be substituted for one another in the two forms of device shown, as may the tab members 13 and 29, and it will also be apparent that the device may be formed of any suitable material, such as metal, paper, cardboard, molded plastic or the like.

I claim:

1. A device for dispensing a measured quantity of divided solid material from a container, which comprises: a container wall member provided with an opening; an open-ended hopper member disposed within said opening and provided with pivotal attachment to said wall member at the side of said hopper opposite said open end, said hopper member being movable from a position substantially wholly to one side of said wall member to a position at least partly to the other side of said wall member, whereby, when said container wall member is in position with respect to a container, said hopper member may be moved between inner and outer positions in which the open end thereof is respectively positioned wholly within said container and at least partly outside said container; and guide members secured to one of the two first-mentioned members adjacent the open end of said hopper member and cooperating with said container wall member to define a material-receiving space, said guide members being so disposed as to direct material from said space into the hopper member.

2. The invention set forth in claim 1, said guide members being secured to said container wall member.

3. The invention set forth in claim 1, said guide members being secured to said hopper member.

EDWARD J. BARNETT.